3,092,598
THERMAL STABILIZATION OF LATEXES OF HALOETHYLENE POLYMERS WITH CHLORINE DIOXIDE OR CHLORITES
Harold G. Hahn, Robert L. Visger, and William J. Raich, Midland, Mich., assignors to The Dow Chemical Company, Midland, Mich., a corporation of Delaware
No Drawing. Filed Aug. 14, 1958, Ser. No. 754,929
9 Claims. (Cl. 260—29.6)

This invention relates to improved latexes composed of haloethylene polymers. In particular it relates to such latexes wherein the polymeric component exhibits improved thermal stability.

The family of so-called haloethylene polymers, such as the polymers and copolymers of vinylidene chloride and vinyl chloride together or with another monoethylenically unsaturated comonomer, are noted for their uniquely valuable physical and chemical properties. Because of these properties they have found a wide variety of advantageous uses. However, the chemical inertness or insolubility, or both, of the haloethylene polymers has frequently limited their exploitation with fabrication methods that employ a fluid medium. In addition the haloethylene polymers are notoriously unstable to elevated temperatures and, upon such exposure, tend to exhibit rapid discoloration.

When the haloethylene polymers are to be thermally fabricated, it is possible to blend substantial quantities of a heat stabilizing agent with the polymer. The heat stabilizers that have been employed in this manner have included certain inorganic materials, such as the phosphates, which tend to lower the mechanical stability of any latex to which they are added. Or, water-insoluble, organic materials, which are virtually impossible to disperse uniformly throughout an aqueous solution or dispersion, are also employed for stabilization of the haloethylene polymers intended to be thermally fabricated.

Among the more useful compositions from which the haloethylene polymers may be fabricated are the emulsion polymerizates, which are frequently referred to as latexes. These latexes permit the facile preparation of coating films, foils and other similar continuous coherent articles. Because of the above mentioned difficulties of incorporating many of the known heat stabilizers with haloethylene polymers in latex form the heat stability of the polymer was sacrificed or a different polymer was employed for many end uses. In addition, it is impractical to avoid stabilization of haloethylene polymers since, in such instances, it is observed that fusion, heat sealing, and other thermal treatments of the polymer causes discoloration of the resultant articles. This is due to the considerable thermal sensitivity of the polymer.

It would be desirable to have, and it is the principal object of this invention to provide, an improved latex composition containing a thermally stable haloethylene polymer.

The above and related objects are accomplished by means of a composition in accordance with the present invention which consists essentially of an aqueous emulsion polymerizate of a monomeric material comprising a haloethylene monomer and a small amount of a compound which releases chlorine dioxide in aqueous solution.

The haloethylenic polymers that are useful in the composition of the invention are those having pendant halogen atoms attached directly to the carbon-carbon chain. Representative of such polymeric materials are the polymers of vinylidene chloride, the polymers of vinyl chloride and the copolymers of vinylidene chloride and vinyl chloride together or with another monoethylenically unsaturated comonomer such as vinyl esters, including vinyl acetate and vinyl propionate, alkyl acrylates having from 1 to about 8 carbon atoms in the alkyl group, the alkyl methacrylates having from 1 to about 8 carbon atoms in the alkyl group, and acrylonitrile. The invention likewise contemplates terpolymers of the above monomeric materials and other monomeric compositions having pendant chlorine atoms from the polymeric chain. Many such compositions will be known. Those copolymers containing a preponderant amount, that is at least 50 percent, of vinylidene chloride are preferred polymeric materials for use in the compositions of the present invention. These preferred copolymers are unusually sensitive to thermal degradation, as evidenced by their severe discoloring when they are exposed to heat at elevated temperatures.

The useful stabilizers in the compositions of this invention are compounds which release chlorine dioxide in aqueous solution. Representative of such compounds are the alkali metal chlorites, including specifically sodium, potassium and lithium chlorites. Also operable is chlorine dioxide gas itself. Because of its availability and ease of handling, sodium chlorite is preferred. It is necessary that the chlorine dioxide be readily available in adequate amounts. For this reason compounds such as sodium chlorate or the other water-soluble chlorates do not provide the desired improvements. In addition chlorates and other oxidizing agents, such as oxygen, permanganates, dichromates, and the like result in adverse effects including embrittlement of the final product. Thus, although a chlorate may exhibit a short term advantage, it is negated by the adverse effects of its second role as an oxidizing agent.

The amount of chlorine dioxide releasing agent which is to be employed will vary with the specific polymeric material and with the specific chlorine dioxide releasing compounds. The protective effects may be noticed when as little as 0.5 percent by weight of the compound is incorporated in the latex. However, with the preferred vinylidene chloride copolymers, it is most advantageous to use at least one percent of the weight of polymer solids of the stabilizing agent. The upper limit will be determined principally by the aqueous solubility of the compound used and also by practical matters such as economic considerations. In most instances there will be little additional benefit to justify the use of substantially more than about 5 percent of the weight of polymer solids of the stabilizing agent.

The agents are easily incorporated into the latex by simple intermixing using conventional techniques. Thus, the chlorine dioxide gas may be bubbled through the latex until a requisite or desired amount is present therein. The inorganic chlorites may be carefully added to the latex while agitated or may be added as an aqueous solution. To guard against premature coagulation which may result from too rapid addition of any salt it may be desirable to stabilize the latex by the addition of small amounts of additional emulsifier.

The latex compositions may contain the outer usual additives, such as dyes, pigments, light stabilizers and fillers that, pursuant to conventional practice, are suitable for incorporation in the polymer formulation.

The advantages of the compositions will be more apparent from the following illustrative examples, wherein all parts and percentages are to be taken by weight.

EXAMPLE I

A monomer composition of 60 percent ethyl acrylate and 40 percent vinyl chloride was polymerized to a 50 percent solids latex by conventional emulsion polymerization techniques. One sample of the latex was prepared without any stabilizer. Another sample of the latex was prepared by similarly polymerizing the same monomer composition with 0.5 percent sodium chlorite in the polymerization recipe. The unstabilized latex was divided into three parts. Into one of these there was added 2 percent sodium chlorite after polymerization. In a second portion there was added 6 percent sodium chlorite after polymerization. The third part was left unstabilized for comparative purposes. The latexes were allowed to stand over night at room temperature. They were then cast into films on glass plates. The films were dried, then exposed to 150° C. for a period of 2 hours. The extent of discoloration from this exposure was determined by measuring the percent transmission of light having average wave lengths of about 420 millimicrons through the heat treated films. This transmission determination was made with a spectrophotometer, made by the Beckman Company. The results were as follows.

*Table I*

| Percent $NaClO_2$: | Percent transmission |
| --- | --- |
| 0 (for comparison) | 77.0 |
| 0.5 in polymerization charge | 83.2 |
| 2.0 in latex after polymerization | 83.2 |
| 6.0 in latex after polymerization | 85.2 |

The improvement of heat stability of the polymer is readily apparent from the above results.

EXAMPLE II

A comonomer composition of 89 percent vinylidene chloride and 11 percent acrylonitrile was emulsion polymerized to a 55 percent solids latex. After adjusting the pH to 2.00, various amounts of sodium chlorite were added to separate portions of the latex. The modified latexes were then placed in a 60° C. oven over night, along with an unmodified control sample. The latex samples were then cast into films and heat treated for a period of 30 minutes at 150° C. The resulting discoloration was evaluated by measuring the percent transmission of a 420 millimicrons wave length light through the films with a Beckman spectrophotometer. The following data was obtained.

*Table II*

| Percent $NaClO_2$: | Percent transmission |
| --- | --- |
| 0 | 66.3 |
| 1.0 | 70.1 |
| 2.0 | 70.6 |

EXAMPLE III

A comonomer composition of 75 percent vinyl chloride and 25 percent vinylidene chloride was polymerized to about a 55 percent solids latex. After adjusting the pH to 2.00, 6 percent $NaClO_2$ was added to the latex. This modified latex and an identical but unmodified control latex were placed in a 60° C. oven over night. The latexes were then plasticized with 20 percent dioctyl phthalate and cast to films by a conventional method. The films were then heat treated for a period of three hours at 150° C. The resulting discoloration was evaluated by the method given in Examples I and II. The data were as follows.

*Table III*

| Percent $NaClO_2$: | Percent transmission |
| --- | --- |
| 0 | 61.0 |
| 6.0 | 69.2 |

EXAMPLE IV

Separate latex samples were prepared from a monomeric composition consisting of 55 percent vinylidene chloride and 45 percent vinyl chloride. One of the latex samples was left unstabilized for purposes of comparison. To another sample there was added 3 percent sodium chlorate, also for purposes of comparison. To a third latex sample there was added 3 percent sodium chlorite in accordance with the present invention. The percent reflectance of each of the latex samples was then determined. The percent of reflectance was calibrated with a white magnesium oxide block set to indicate 100 percent reflectance.

*Table IV*

| Salt added: | Percent reflectance of latex |
| --- | --- |
| 0 (for comparison) | 6 |
| 3% $NaClO_3$ (for comparison) | 20 |
| 3% $NaClO_2$ | 49 |

Similar results are observed when the chlorine dioxide releasing agents are employed with latexes of other haloethylene polymers including polyvinyl chloride and polyvinylidene chloride. In addition the benefits are realized when the chlorine dioxide releasing agents are employed in conjunction with other known heat stabilizers, such as the conventional organo-metallic compounds.

What is claimed is:

1. A latex composition consisting essentially of (1) the aqueous emulsion polymerizate of a monomeric material composed essentially of at least one monomer selected from the group consisting of vinyl chloride and vinylidene chloride and (2) stabilizing amounts of a compound selected from the group consisting of chlorine dioxide and alkali metal chlorites.

2. The composition claimed in claim 1, wherein said monomer is comprised of vinylidene chloride.

3. The composition claimed in claim 1, wherein said monomeric material contains at least 50 percent vinylidene chloride with the remainder of at least one other monoethylenically unsaturated comonomer that is copolymerizable with vinylidene chloride.

4. The composition claimed in claim 3, wherein said monoethylenically unsaturated comonomer is vinyl chloride.

5. The composition claimed in claim 3, wherein said monoethylenically unsaturated comonomer is acrylonitrile.

6. The composition claimed in claim 1, wherein said monomeric material is composed of vinyl chloride and at least one other monoethylenically unsaturated comonomer that is copolymerizable with vinyl chloride.

7. The composition claimed in claim 6, wherein said monoethylenically unsaturated comonomer is ethyl acrylate.

8. The composition claimed in claim 1, wherein said alkali metal chlorite is sodium chlorite.

9. The composition claimed in claim 1, wherein said compound is employed in a concentration of from about 0.5 to 10 percent by weight of the polymer solids of said emulsion polymerizate.

References Cited in the file of this patent

UNITED STATES PATENTS

| 2,482,038 | Temple | Sept. 13, 1949 |
| 2,557,474 | Sanderson | June 19, 1951 |
| 2,643,988 | Walter | June 30, 1953 |